United States Patent [19]

Yamane et al.

[11] Patent Number: 5,220,407
[45] Date of Patent: Jun. 15, 1993

[54] METHOD FOR MEASURING THE DIMENSIONS OF AN OPTICAL CONNECTOR

[75] Inventors: Motohiro Yamane; Takashi Shigematsu, both of Tokyo, Japan

[73] Assignee: The Furukawa Electric Co., Ltd., Tokyo, Japan

[21] Appl. No.: 796,399

[22] Filed: Nov. 22, 1991

[30] Foreign Application Priority Data

| Nov. 26, 1990 [JP] | Japan | 2-321847 |
| Nov. 26, 1990 [JP] | Japan | 2-321848 |
| Nov. 26, 1990 [JP] | Japan | 2-321849 |
| Nov. 29, 1990 [JP] | Japan | 2-331052 |

[51] Int. Cl.$^5$ .................................................. G01B 11/00
[52] U.S. Cl. ........................................... 356/372; 356/375
[58] Field of Search ................... 356/372, 375, 378; 385/52, 60, 56, 62, 71, 72, 81

[56] References Cited

U.S. PATENT DOCUMENTS

| 4,188,087 | 2/1980 | D'Auria et al. ............... 385/60 |
| 4,990,770 | 2/1991 | Hemmann et al. ......... 250/227.24 |

FOREIGN PATENT DOCUMENTS

| 0313128 | 4/1989 | European Pat. Off. |
| 2506930 | 12/1982 | France |

OTHER PUBLICATIONS

Patent Abstracts of Japan, vol. 14, No. 309, Jul. 1990, and JP-A-20 99 908, Yamaki Yasuhiro, et al.

Primary Examiner—F. L. Evans
Attorney, Agent, or Firm—Frishauf, Holtz, Goodman & Woodward

[57] ABSTRACT

A method for measuring the dimension of an optical connector, consisting of a step wherein an inspection ferrule provided with a single optical fiber is inserted in each pin hole in the sample ferrule and an optical fiber or fibers are inserted in the fiber inserting hole or holes, a step wherein the sample ferrule is located on a position measuring apparatus on the X or Y axis, a step wherein a light transmitting and receiving ferrule provided with a light transmitting and receiving fiber, which is installed on a Z-axis stage, is butted against the sample ferrule with a specific distance, a step wherein the sample ferrule is moved in the direction of the axis X or Y by the position measuring apparatus, thereby optically connecting the single optical fiber or one of the optical fibers to the light transmitting and receiving fiber, a step wherein the sample ferrule is moved in the direction of the axis X or Y by the position measuring apparatus and the light transmitting and receiving fiber is switched to the single optical fiber or other optical fiber, thereby measuring the position of each optical fiber of the sample ferrule and the inspection ferrules, and a step wherein the position of the center of each fiber inserting hole based on the pin holes of the sample ferrule is determined from the measurement results.

17 Claims, 7 Drawing Sheets

METHOD FOR MEASURING THE DIMENSIONS OF AN OPTICAL CONNECTOR

BACKGROUND OF THE INVENTION

1. Field of the Invention

The present invention relates to a method for measuring the dimensions of an optical connector which is provided with a ferrule having an optical fiber or fibers to be inserted and fixed into one or a plurality of fiber inserting holes, and a plurality of pin holes to which a plurality of positioning guide pins are fitted, wherein the position or positions of said fiber inserting hole or holes are measured using said pin holes as the reference.

2. Description of Related Art

An optical connector consists of a single or multi optical fibers installed on a ferrule which has positioning pin holes for butt-connection. An optical connector which uses a single optical fiber is referred to as a single connector, and one that uses multiple optical fibers is referred to as a multi connector.

Among such optical connectors, a multi connector, for instance, has a plurality of fiber inserting holes formed in a plastic ferrule at regular arranging pitches, and the individual optical fibers of the multi fiber are inserted in those respective fiber inserting holes, then they are fixed with an adhesive agent. To butt such multi connector against a mating multi connector, the guide pins are fitted to the pin holes of both to position them for butt-connection. Thus, matching optical fibers are optically connected each other. The same applies to a single connector.

In said optical connector, a connection loss inherent to the butt-connection with another optical connector is minimized by aligning the optical axes of the individual optical fibers. For this reason, the fiber inserting holes require precision machining of a submicron order.

Because of such requirement, in optical connectors or ferrules, the dimension measurement is conducted to inspect the positions of the fiber inserting holes in order to ensure quality control for screening for nondefectives by judging whether a manufactured optical connector is defective or nondefective. In the dimension measurement of a ferrule, for example, an inspection light is irradiated to a butting surface of a ferrule whose fiber inserting holes are all exposed, and the inspection light reflecting from the butting surface, that is, a reflecting light, is used to perform optical measurement of the position of each fiber inserting hole by a position measuring means.

However, when the fiber inserting holes are measured using the reflecting light as described above, there was a problem that a measurement error which is not permissible at the submicron level results if a circumferential edge of a fiber inserting hole is chipped or if the hole shape is distorted.

As explained already, optical connectors are positioned by fitting the guide pins into the pin holes of both optical connectors, thus properly connecting them. Therefore, the measurement of the fiber inserting holes requires position measurement based on the pin holes.

However, it is necessary to measure the pin holes and the fiber inserting holes separately because the diameter of the pin holes is a few times larger than that of the fiber inserting holes. This makes the measurement extremely complicated with an insufficient measurement accuracy.

SUMMARY OF THE INVENTION

An object of the present invention is to provide a method for measuring the dimensions of an optical connector which allows the positions of fiber inserting holes of an optical connector to be measured at a time with high accuracy by using pin holes as the reference.

According to the method for measuring the dimensions of an optical connector of the present invention, the optical connector is provided with a sample ferrule that has one or a plurality of fiber inserting holes into which one or a plurality of optical fibers are inserted and a plurality of pin holes to which a plurality of positioning guide pins are fitted. The method for measuring the dimensions of an optical connector, whereby the position or positions of said fiber inserting hole or holes are measured, comprises a step wherein an inspection ferrule provided with a single optical fiber is inserted in each pin hole in said sample ferrule so that it can be installed or removed as necessary and an optical fiber or fibers are inserted in said fiber inserting hole or holes, a step wherein said sample ferrule is located in a specific position on a position measuring means which moves the sample ferrule in the direction of an axis, X or Y, and measures a new position of the sample ferrule on the X or Y axis, a step wherein a light transmitting and receiving ferrule provided with a light transmitting and receiving fiber, which is installed on a Z-axis stage which is positioned in the vicinity of said position measuring means and is free to move in the direction of Z axis intersecting orthogonally with surfaces of the two axes X and Y, is butted against said sample ferrule in the direction of the Z axis through said Z-axis stage with a specific distance provided between them, a step wherein said sample ferrule is moved in the direction of the axis X or Y by said position measuring means while letting in an inspection light emitted by a light source either through the optical fiber or fibers inserted in said fiber inserting hole or holes or through said light transmitting and receiving fiber and letting it out toward a light receiving means from the other side, thereby optically connecting said single optical fiber or one of said optical fibers to the light transmitting and receiving fiber, a step wherein said sample ferrule is moved in the direction of the axis X or Y by said position measuring means and said light transmitting and receiving fiber is switched to said single optical fiber or other optical fiber in succession to measure the inspection light irradiated to said light receiving means under specific measuring conditions, thereby measuring the position of each optical fiber of the sample ferrule and the inspection ferrules, and a step wherein the position of the center of each fiber inserting hole based on the pin holes of said sample ferrule is determined from the measurement results.

Preferably, the sample ferrule is located in a specific position on the axis X or Y by an opening or V grooves provided in the position measuring means. In this way, an optical connector subjected to measurement can be always set in a specific position with respect to the position measuring means, making it possible to minimize a measurement error.

Further, the position measuring means is preferably provided with a Z-axis scale with a Z-axis controller, a specific distance for butting said light transmitting and receiving ferrule against said sample ferrule is measured by said Z-axis scale, and the position of each optical fiber of said sample ferrule and the inspection ferrules is measured while maintaining the specific distance at a constant value in accordance with a pre-measured transmission loss of the inspection light based on the distance between said light transmitting and receiving ferrule and said sample ferrule. This permits prevention of measurement errors in inspection lights caused by different distances between an sample ferrule and light transmitting and receiving ferrule when measuring the optical connector.

Preferably, as a specific measurement condition for measuring the position of each optical fiber of said sample ferrule and the inspection ferrules, measurement is performed so that the intensity of an inspection light in measurement performed with said single optical fiber or one of said optical fibers optically connected to the light transmitting and receiving fiber is equal to the intensity of each inspection light at the time when said sample ferrule is moved to a plurality of points in the direction of said axis X or Y by said position measuring means, and the position of a pin hole is determined from that measuring position, then the position of each optical fiber of said sample ferrule is measured based on the position of the pin hole.

In this case, the inspection ferrule and the optical fibers to be inserted in the fiber inserting holes must be free from eccentricity both in the inspection ferrule itself and cores.

In addition, as a specific measurement condition for measuring the position of each optical fiber of said sample ferrule and the inspection ferrules, each of said inspection ferrules is preferably turned in said pin hole for a plurality of times for a specific angle to determine the position of the pin hole from the position of said single optical fiber measured at each turn angle, and the position of each optical fiber of said sample ferule is measured based on the position of the pin hole.

Thus, the accuracy of the measurement of the position of each optical fiber can be improved by measuring the inspection light at a plurality of points for each optical fiber, even if the inspection ferrule has an eccentric center in relation to a center of the pin hole.

As a light source for the inspection light, an LED, semiconductor laser or the like which has a minimum of fluctuation in light intensity is used.

In addition, as the position measuring means for measuring the position of each optical fiber of the optical connector adjusted in the direction of one of the two axes, an optical stage that permits fine adjustment of the position on one of the two axes, for example, an X-Y stage provided with a laser scale for measuring the position on the axis X or Y is used.

At this time, the position of said laser scale on one of the two axes is adjusted by an X-Y corrector to position it in the initial position (origin). The fine adjustment of the position of the X-Y stage itself on one of the two axes can be made by hand. The fine adjustment can also made mechanically using, for example, an X-Y controller.

Further, the Z-axis scale which is provided with the Z-axis controller and which is installed on the position measuring means uses, for instance, a glass scale.

When an inspection ferrule is inserted in a pin hole of the optical connector, the optical fiber of the optical connector and that of the inspection ferrule are exposed at the butting end surface of the optical connector.

The position of a fiber inserting hole can be determined based on the pin holes of the optical connector by measuring the central position for each optical fiber.

According to the method for measuring the dimensions of an optical connector of the present invention, an inspection ferrule with a single optical fiber is inserted in a pin hole of an optical connector, making it possible to measure the positions of the individual optical fibers and of the pin holes at a time without using any other method. Therefore, it is not required to measure the positions of the pin holes and the positions of the individual optical fibers separately, permitting easy determination of the position of each optical fiber by using the pin holes as the reference.

The object described above and other objects, features and advantages of the present invention will be further clarified by the following detailed explanation based on attached drawings.

DETAILED DESCRIPTION OF THE PREFERRED EMBODIMENTS

An embodiment of the present invention is now described in detail with reference to FIG. 1 through FIG. 8.

Figure 1:
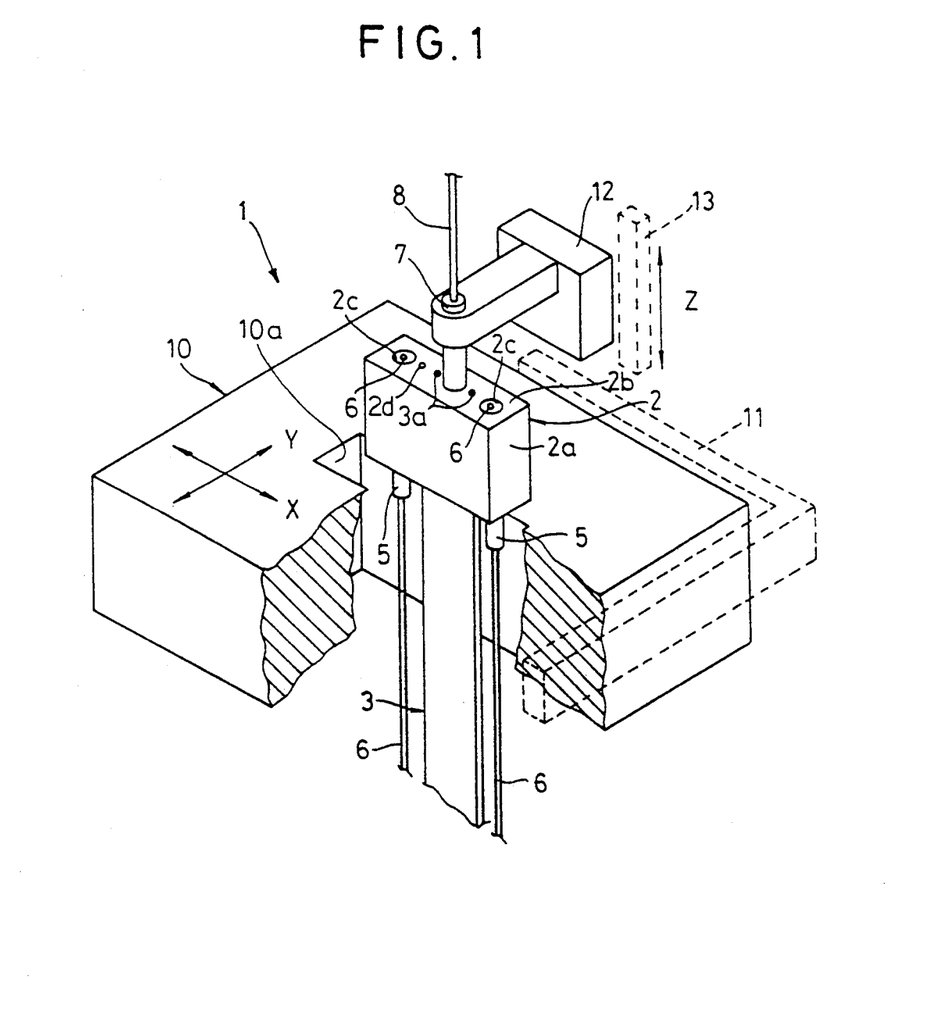
FIG. 1 is a schematic configuration diagram depicting the mechanical configuration of a dimension measuring system for implementing the method according to the present invention.

FIG. 1 shows the configuration of a dimension measuring system 1 for implementing the method according to the present invention. The dimension measuring system 1 is provided with an X-Y stage 10, a laser scale 11, a Z-axis stage 12, a Z-axis scale 13, and a computer (ECU) 14. These components constitute a position measuring means.

The X-Y stage 10, as illustrated, has a rectangular opening 10a which is vertically formed at the center and through which an optical connector, a multi connector 2, for example, to be measured is installed. The X-Y stage 10 as well as the multi connector 2 positioned and installed in the opening 10a can be inched in the directions of X and Y shown by arrows in the drawing. Their movement in the direction of the axis X or Y is controlled by an X-Y controller 20 shown in FIG. 2.

Thus, the position of the multi connector 2 on the X or Y axis is micro-adjusted.

As shown in FIG. 1, the multi connector 2 has a multi fiber 3 inserted in a fiber inserting hole 2d of a sample ferrule 2a. On a butting end surface 2b, one end of each optical fiber 3a is exposed. The cores of the individual optical fibers 3a must be free of eccentricity; they may be temporarily installed in or glued to be fixed in said fiber inserting holes 2d. The multi fiber 3 is connected to a light source 4 (see FIG. 2) which has an LED on the other end. Further, pin holes 2c and 2c are formed in either side where the ends of the optical fibers 3a of the sample ferrule 2a are exposed, and an inspection ferrule 5 is inserted in each pin hole 2c so that it can be installed or removed as necessary.

Figure 2:
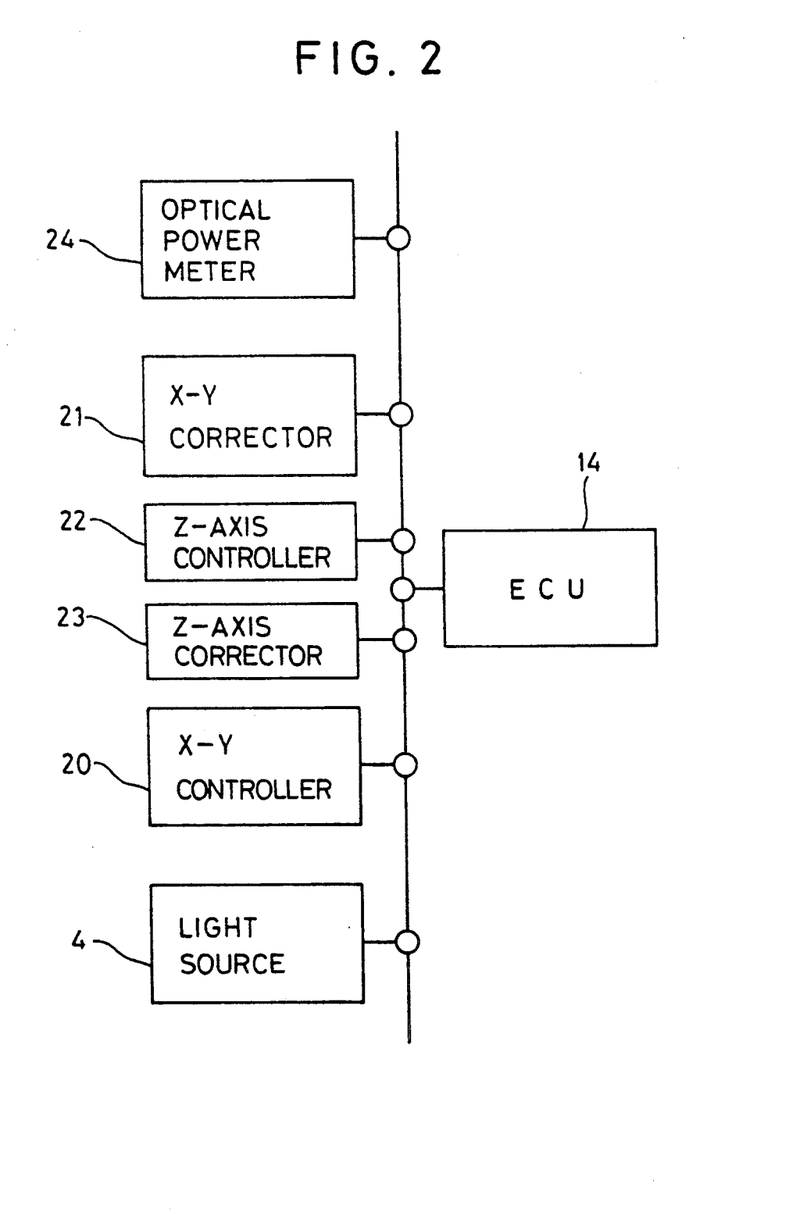
FIG. 2 is a schematic connection diagram depicting the electrical connection of the dimension measuring system shown in FIG. 1.

The inspection ferrule 5 is used to measure the central position of the each pin hole 2c, and is mounted on one end of a single optical fiber 6 whose other end is connected to the light source 4 (see FIG. 2). The inspection ferrules 5 must be free from eccentricity to ensure highly accurate measurement of the pin holes.

The laser scale 11 is used to measure the position of the X-Y stage 10 to which the multi connector 2 has been installed and which has been inched in the X-Y axis directions, and its position on the axes X and Y is adjusted by an X-Y corrector 21 shown in FIG. 2. Accordingly, the laser scale 11 is positioned in the initial location, i.e., the origin, of measurement by the X-Y corrector 21.

The Z-axis stage 12 holds a light transmitting and receiving ferrule 7 and moves in the direction of the Z axis which intersects orthogonally with a plane defined by the X-Y stage 10 as shown by an arrow Z in FIG. 1, thereby butting the light transmitting and receiving ferrule 7 against the multi connector 2 with a specific distance provided between them. The movement of the Z-axis stage 12 in the direction of the Z axis is controlled by a Z-axis controller 22 shown in FIG. 2.

The Z-axis controller 22 controls the position of the Z-axis stage 12 so that the gap between the light transmitting and receiving ferrule 7 and the sample ferrule 2a is maintained at a desired distance at all times according to pre-measured transmission losses of the inspection light based on the distance between the light transmitting and receiving ferrule 7 and the sample ferrule 2a.

Therefore, in the measurement of the dimensions of an optical connector subjected to inspection, the distance between the two ferrules 2a and 7 is kept constant even if the sample ferrule 2a to be butt-connected to the light transmitting and receiving ferrule 7 differs. As a result, the connection loss is maintained at a constant level, assuring a highly accurate measurement of the inspection light.

For instance, in the inspection ferrule 5 and the light transmitting and receiving ferrule 7, a transmission loss $L_D$ at each moving point is measured while moving the Z-axis stage 12 in the Z-axis direction with the centers of the cores of the optical fibers 6 and 8 aligned.

At this time, the intensity of the inspection light emitted from the light source 4 is monitored to eliminate measurement errors caused by different distances between the end surfaces of the inspection ferrule 5 and the light transmitting and receiving ferrule 7.

Figure 3:
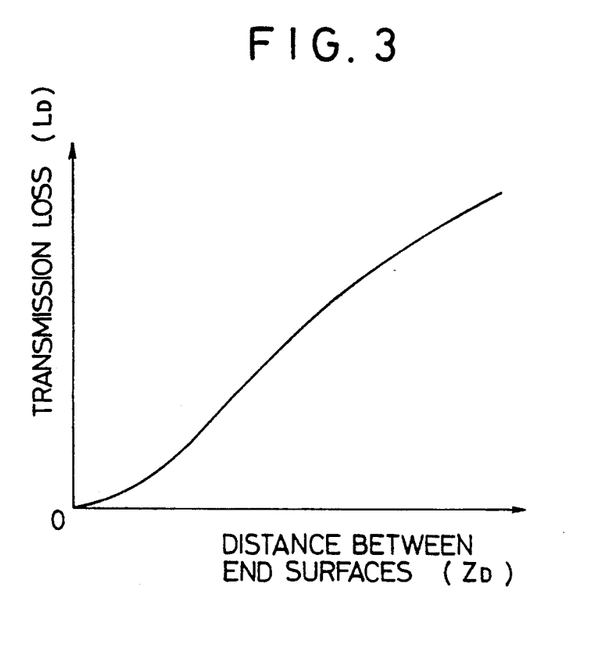
FIG. 3 is a correlation chart depicting the relationship between the distance between the end surface of an optical connector and the end surfaces of inspection ferrules, and the transmission loss of an inspection light.

Based on the measurement results, the correlation chart for the transmission loss $L_D$ and a distance $Z_D$ between the end surfaces shown in FIG. 3 is prepared. The correlation chart is used for the measurement so as to always maintain the distance between the light transmitting and receiving ferrule 7 and the inspection ferrule 5 at a desired value.

The Z-axis scale 13 measures a position of the Z-axis stage 12 on the Z axis, i.e., a vertical position, and its Z-axis position is adjusted by a Z-axis corrector 23 shown in FIG. 2. Thus, the Z-axis scale 13 is located in the measurement initial position, i.e., the origin, by the Z-axis corrector 23.

The light transmitting and receiving ferrule 7 is mounted on one end of a light transmitting and receiving fiber 8 whose other end is connected to an optical power meter 24 (see FIG. 2). It is butted against a multi connector 2 to optically connect the light transmitting and receiving fiber 8 to one of the optical fibers 3a and 6.

An optical power meter 24 measures the intensity of the inspection light transmitted through the light transmitting and receiving fiber 8 from the light source 4. The light intensity measured by the optical power meter 24 is converted into a specific signal and supplied to a computer 14 which calculates the position of the core center of each of the optical fibers 3a and 6.

The light source 4, X-Y controller 20, X-Y corrector 21, Z-axis controller 22, Z-axis corrector 23, and optical power meter 24 are connected to the computer 14 as illustrated in FIG. 2 and their operation is controlled by the computer 14.

The method for measuring the dimensions of an optical connector according to the present invention uses the above-mentioned dimension measuring system, and it is implemented as follows:

First, the inspection ferrules 5 are inserted in the pin holes 2c of the multi connector 2 so that they are almost flush with the butting end surface 2b.

Then, the Z-axis scale 13 is positioned in the origin on the Z axis by the Z-axis corrector 23. The multi connector 2 is installed in the opening 10a in the X-Y stage 10, and the Z-axis stage 12 is lowered. This causes the light transmitting and receiving ferrule 7 to butt against the butting end surface 2b of the multi connector 2, thereby almost butt-connecting the light transmitting and receiving fiber 8 to the first optical fiber among the optical fibers 3a and 6 for which the position of the core center is to be determined.

At this time, it is not necessary to completely connect the light transmitting and receiving ferrule 7 closely to the multi connector 2; instead, a constant distance between them should be maintained during the measurement of the inspection light from a specific optical fiber. The intensity of the inspection light measured by the optical power meter 24 under such approximate connection is taken as $P_A$. Also, in that position, the laser scale 11 is positioned in the origin on the X and Y axes by the X-Y corrector 21.

Then, the X-Y stage 10 is operated to move the multi connector 2 in an optional direction within a range of the first optical fiber, and the X-Y stage 10 is stopped in a position where, for instance, the intensity of the inspection light measured by the optical power meter 24 becomes $(P_A - 1)$dB. The then coordinate position $(X_{11}, Y_{11})$ is measured by the laser scale 11.

After that, the X-Y stage 10 is actuated again to move the multi connector 2 to another position within the range of that intensity of light keeping within a range of the first optical fiber, and a coordinate position $(X_{12}, Y_{12})$ where the intensity of the inspection light becomes $(P_A - 1)$dB is measured in the same manner.

Figure 4:
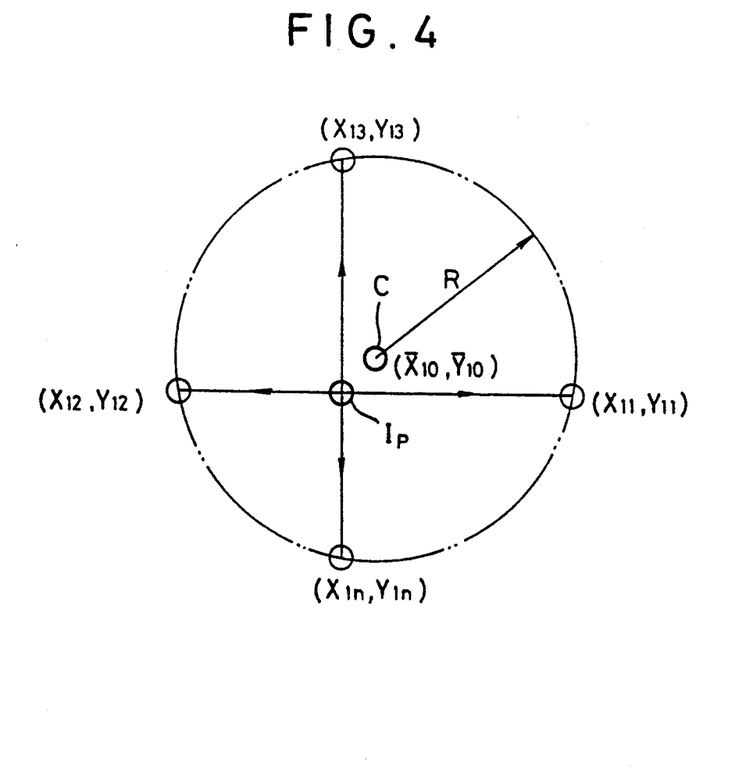
FIG. 4 is an explanatory diagram depicting the measurement of central position of pin holes in a multi connector and each optical fiber according to the present invention.

A series of the steps described above is repeated on the first optical fiber for a total of n times (n≧3) to measure n coordinate positions as shown in FIG. 4. The n points have the same transmission loss of the inspection light and lie on a circumference which is equidistant from a core center C in the first optical fiber. In FIG. 4, a point $I_P$ is the initial position when the light transmitting and receiving fiber 8 is almost butt-connected and the intensity of the inspection light is $P_A$.

Accordingly, based on the n points, the following expressions for the core center C ($\overline{X}_{10}$, $\overline{Y}_{10}$) and a radius R of the first optical fiber are derived from the equation of circle:

$$(X_{11} - \overline{X}_{10})^2 + (\overline{Y}_{11} - Y_{10})^2 = R^2$$
$$(X_{12} - \overline{X}_{10})^2 + (\overline{Y}_{12} - Y_{10})^2 = R^2$$
$$\vdots$$
$$(X_{1n} - \overline{X}_{10})^2 + (\overline{Y}_{1n} - Y_{10})^2 = R^2$$

Based on the expressions above, the core center C ($\overline{X}_{10}$, $\overline{Y}_{10}$) of the first optical fiber is calculated by the computer 14 according to the method of least squares.

Thus, the positions of the core centers of the optical fibers 3a based on the centers of the pin holes 2c and 2c of the multi connector 2 can be acquired by determining the positions of the core centers for other optical fibers 3a and 6 which correspond to the second through the nth optical fibers in the same manner.

In this way, an axial deviation of the fiber inserting holes 2d in the multi connector 2 based on the pin holes 2c and 2c can be known, making it possible to judge whether a manufactured optical connector is defective or not.

An accuracy of 0.1 μm was acquired when the positions of the cores of the optical fibers 3a based on the pin holes 2c were measured using a laser scale with an accuracy of 0.1 μm or less in accordance with the method of the present invention.

The method discussed above may be simplified as follows if the measurement accuracy is not required to be that high.

With the multi connector 2 and the light transmitting and receiving ferrule 7 almost connected, the X-Y stage 10 is moved in an optional direction within the range of the first optical fiber. A position where the intensity of the inspection light measured by the optical power meter 24 is the highest, that is, where the transmission loss is the smallest, is measured by the laser scale 11 according to the judgement result given by the computer 14.

In the same manner, the positions of the optical fibers 3a based on the pin holes 2c and 2c of the multi connector 2 can be easily known by determining the positions of other optical fibers 3a and 6 that correspond to the second through the nth optical fibers.

The multi connector 2 was positioned in the opening 10a and installed to the X-Y stage 10, but the optical connector may be also positioned using, for example, V grooves formed in the X-Y stage 10.

Figure 5:
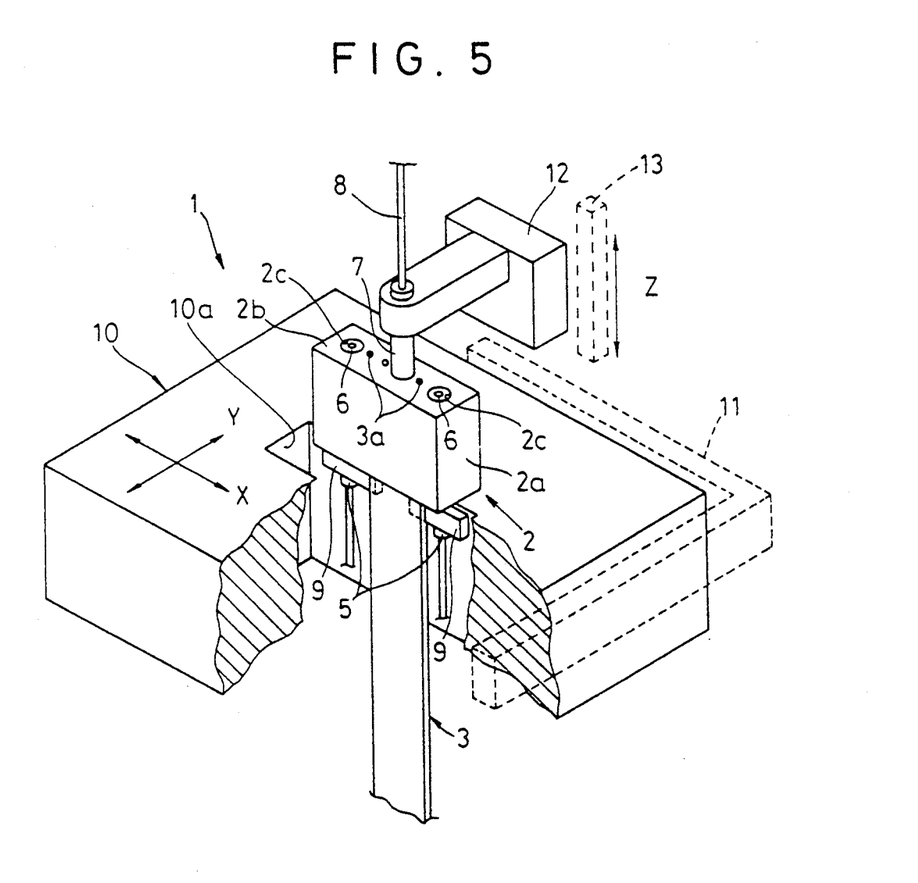
FIG. 5 is a schematic configuration diagram of the dimension measuring system wherein V grooves are used to position the optical connector on an X-Y stage.
Figure 6:
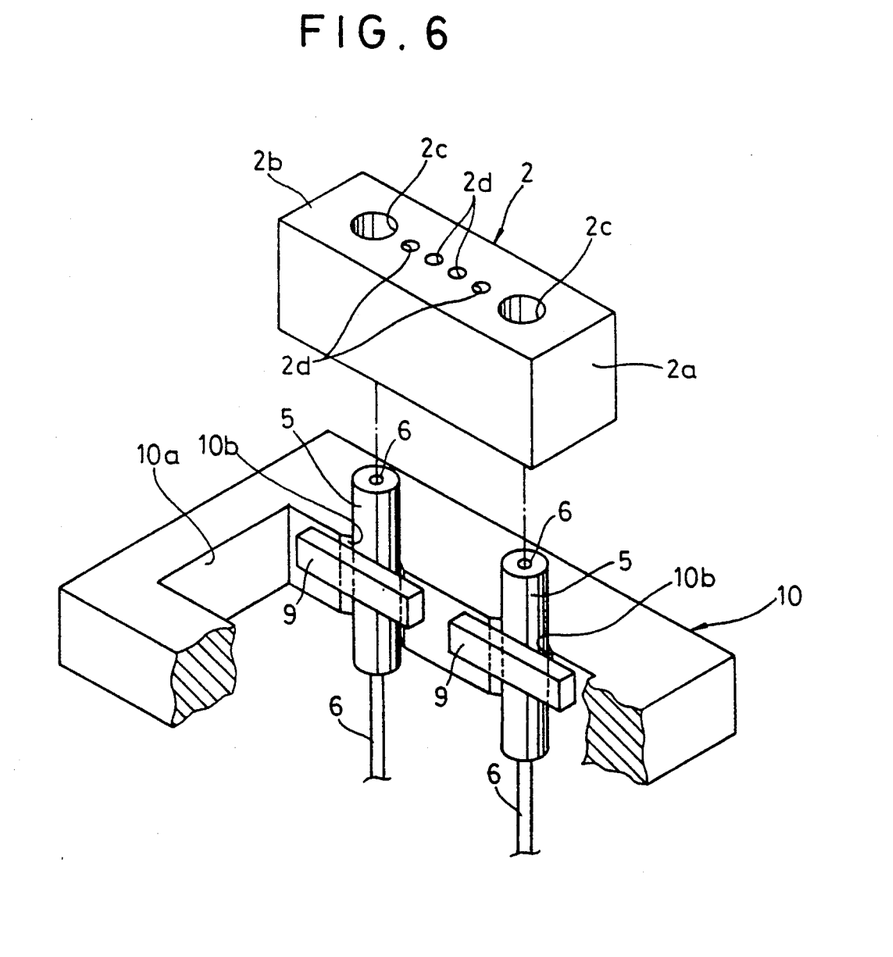
FIG. 6 is a perspective view of a major section related to the V grooves of the X-Y stage shown in FIG. 5.

More specifically, as illustrated in FIG. 5 and FIG. 6, V grooves 10b and 10b are formed in the opening 10a of the X-Y stage 10. The sample ferrule 2a is positioned and mounted on the X-Y stage 10 by fixing both inspection ferrules 5 which are inserted in the pin holes 2c of the sample ferrule 2a into the V grooves 10b with mounting plates 9.

For the measurement discussed above, the inspection ferrules must be free from eccentricity. If, for instance, the inspection ferrule 5 has an eccentric center in relation to the center of the pin hole 2c, then the following procedure is taken to perform measurement.

In the following description and drawings, a single connector is used for the optical connector, and the aforementioned dimension measuring system 1 is used. Accordingly, the same symbols will be used for the components that are identical to the components described above, and detailed explanation will be omitted.

Figure 7:
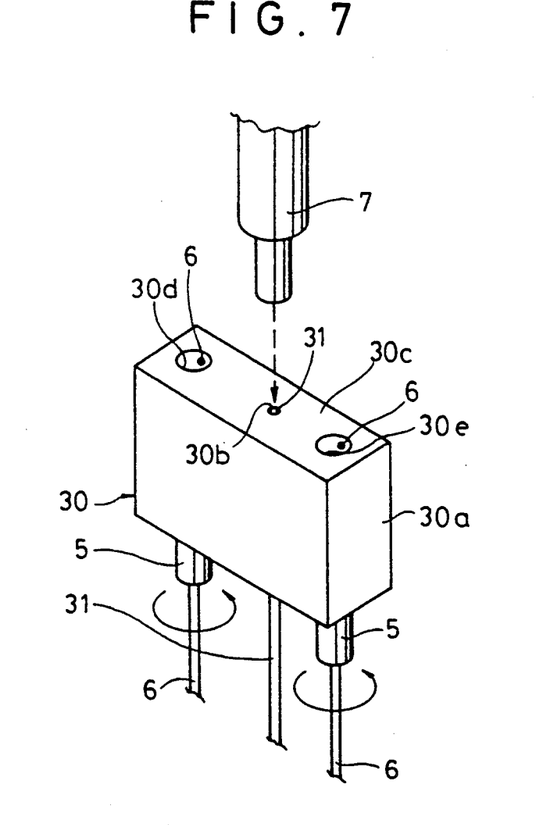
FIG. 7 is a perspective view illustrating a variation example of the method according to the present invention and depicting a major assembly of the dimension measuring system.
Figure 8:
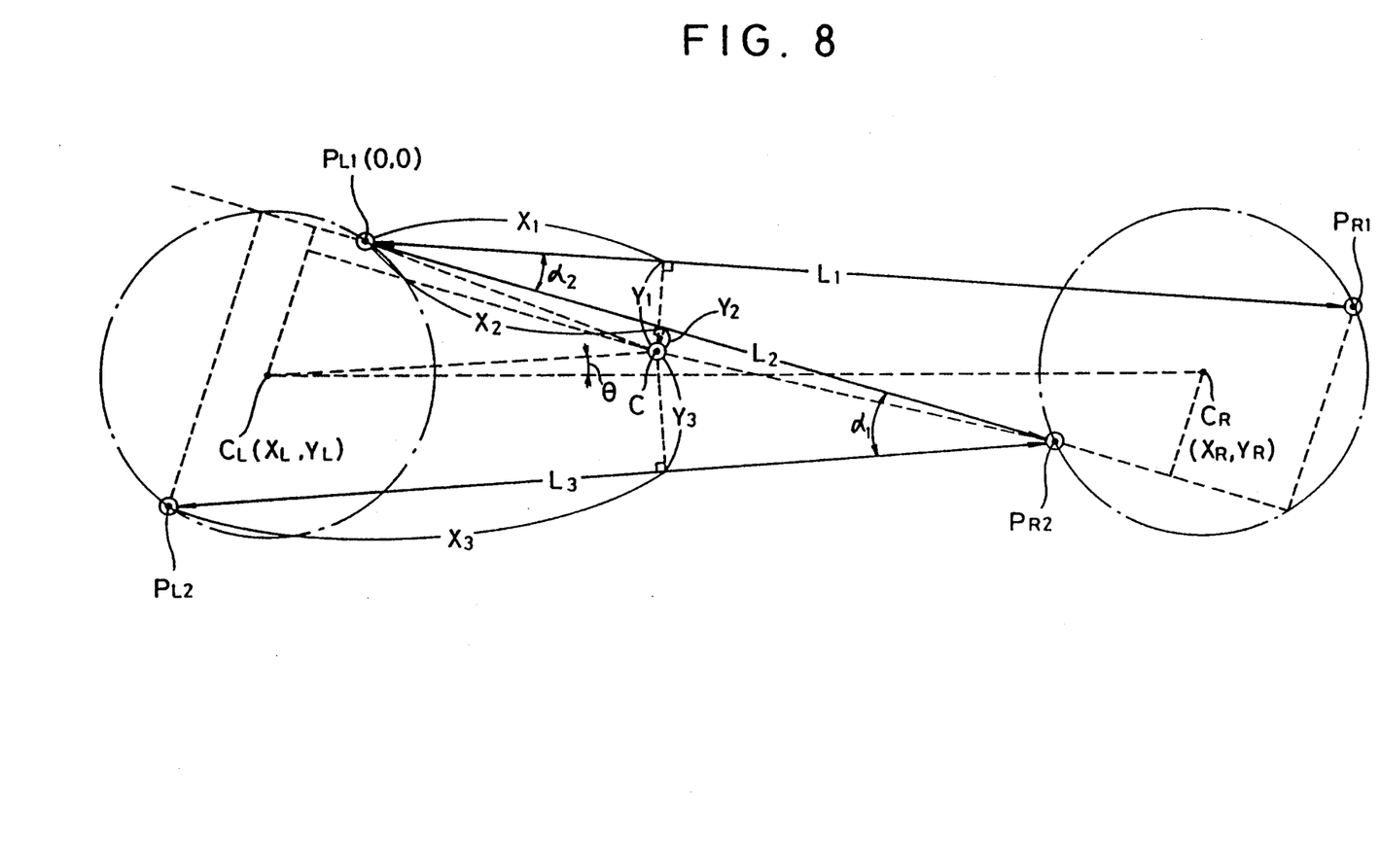
FIG. 8 is a positional relationship diagram illustrating the measurement of the central position of an optical fiber and pin holes.

FIG. 7 and FIG. 8 illustrate the method for measuring a position of an optical fiber based on pin holes when the optical connector is a single connector 30. A sample ferrule 30a has a fiber inserting hole 30b in which one end of an optical fiber 31 is inserted and temporarily attached. The other end of the optical fiber 31 is connected to a light source 4. The upper end of the optical fiber 31 is exposed on the butting end surface 30c of the sample ferrule 30a; pin holes 30d and 30e are provided in either side of the optical fiber 31. Inspection ferrules 5 and 5 are inserted in the pin holes 30d and 30e, respectively as illustrated so that they are free to rotate. Each of the inspection ferrules 5 is provided with a single optical fiber 6.

In the single connector 30, the positions of the optical fibers 6 and 31 are measured in accordance with the following procedure:

First, the inspection ferrules 5 are inserted to the pin holes 30d and 30e of the sample ferrule 30a, and the single connector 30 is positioned and installed to an X-Y stage 10.

Then, a Z-axis scale 13 is located in the origin on a Z axis by a Z-axis corrector 23, and a Z-axis stage 12 with the single connector 30 installed is lowered. This causes the light transmitting and receiving ferrule 7 to be butted against the butting end surface 30c of the single connector 30, thereby almost butt-connecting the light transmitting and receiving fiber 8 to the first optical fiber among the optical fibers 6 and 31 for which the position of the core center is to be determined.

Under the aforementioned condition, the first measurement is performed to determine the coordinate position of the center of the optical fibers 6 and 31.

More specifically, the center of the single optical fiber 6 is located in a position where the intensity of the inspection light measured becomes the highest when the X-Y stage 10 is inched while measuring the intensity of the inspection light radiated from the single optical fiber 6 toward the light transmitting and receiving fiber 8 by an optical power meter 24.

As shown in FIG. 8, a central position $P_{L1}$ of the single optical fiber 6 in the pin hole 30d is taken as an origin (0, 0) on the X-Y stage 10.

Then, the X-Y stage 10 is actuated again to align the optical fiber 31 and the single optical fiber 6 to the optical axis of the light transmitting and receiving fiber 8 in consecutive order. And a central position C of the optical fiber 31 and a central position $P_{R1}$ of the single optical fiber 6 in the pin hole 30e shown in FIG. 8 are measured by the X-Y stage 10 in the same manner as explained above.

Based on the measured values, a distance $L_1$ (= $\overline{P_{L1}P_{R1}}$) between the single optical fibers 6 and 6, and axial deviations $X_1$ and $Y_1$ of the optical fiber 31 shown in FIG. 8 are determined, using the axis which runs through the center $P_{L1}$ of the single optical fiber 6 in the pin hole 30d and the center $P_{R1}$ of the single optical fiber 6 in the pin hole 30e as the reference.

Next, the inspection ferrule 5 inserted in the pin hole 30e is turned 180 degrees in the direction of the arrow shown in FIG. 7, then the second measurement is performed in the same manner as mentioned above to measure a central position $P_{R2}$ of the single optical fiber 6 in the pin hole 30e.

Taking the axis running through the centers $P_{L1}$ and $P_{R2}$ of the single optical fibers 6 and 6 as the reference, a distance $L_2$ ($=\overline{P_{L2}P_{R2}}$) between the single optical fibers 6 and 6 and axial deviations $X_2$ and $Y_2$ of the optical fiber 31 shown in FIG. 8 are determined.

Then, the inspection ferrule 5 inserted in the pin hole 30d is also turned 180 degrees, and the third measurement is carried out to measure a central position $P_{L2}$ of the single optical fiber 6 in the pin hole 30d.

Taking the axis running through the centers $P_{L2}$ and $P_{R2}$ of the single optical fibers 6 and 6 as the reference, a distance $L_3$ ($=\overline{P_{L2}P_{R2}}$) between the single optical fibers 6 and 6 and axial deviations $X_3$ and $Y_3$ of the optical fiber 31 shown in FIG. 8 are obtained.

Thus, using the axis that runs through the centers $P_{L1}$ and $P_{R2}$ of the two single optical fibers 6 and 6 as the reference, an eccentric center $C_R(X_R, Y_R)$ of the pin hole 30e and an eccentric center $C_L(X_L, Y_L)$ of the pin hole 30d can be given by the following expressions:

$$X_L = -(L_3 \cos a_1 - L_2)/2$$

$$Y_L = L_3 \sin a_1/2$$

$$X_R = (L_1 \cos a_2 - L_2)/2 + L_2$$

$$Y_R = L_1 \sin a_2/2$$

where $a_1$ and $a_2$ are expressed by $$a_1 = \mathrm{Tan}^{-1} Y_2/(L_2 - X_2) - \mathrm{Tan}^{-1} Y_3/(L_3 - X_3)$$

$$a_2 = \mathrm{Tan}^{-1} Y_2/X_2 - \mathrm{Tan}^{-1} Y_1/X_1.$$

Therefore, using the eccentric center $C_R$ of the pin hole 30e as the reference, and based on an axis running through the eccentric center $C_R$ of the pin hole 30e and the eccentric center $C_L$ of the pin hole 30d, a distance L ($=\overline{C_R C_L}$) between the pin holes 30d and 30e and a position (X, Y) of the optical fiber 31 can be given by the following expressions:

$$L = \{(X_R - X_L)^2 + (Y_R - Y_L)^2\}^{1/2}$$

$$X = \{(X_2 - X_L)^2 + (Y_2 - Y_L)^2\}^{\frac{1}{2}} \cdot \cos \theta$$

$$Y = \{(X_2 - X_L)^2 + (Y_2 - Y_L)^2\}^{\frac{1}{2}} \cdot \sin \theta.$$

In this case, $\theta$ indicates an angle formed by a line segment which connects the center (X, Y) of the optical fiber 31 and the eccentric center $C_L$, and the axis which goes through the eccentric center $C_R$ of the pin hole 30e and the eccentric center $C_L$ of the pin hole 30d when the eccentric center $C_R$ of the pin hole 30e is used as the reference, and $\theta$ is given by the following expression:

$$\theta = \mathrm{Tan}^{-1}(Y_2 - Y_L)/(X_2 - X_L) - \mathrm{Tan}^{-1}(Y_R - Y_L)/(Y_R - Y_L).$$

Thus, the position (X, Y) of the optical fiber 31 for which the eccentricities of the pin holes 30d and 30e have been corrected can be acquired.

In this case, the rotating angle of the inspection ferrule 5 is not limited as long as the eccentricities of the pin holes 30d and 30e can be measured. However, it is desirable to give it a half turn, i.e., 180 degrees in order to reduce the number of measurements.

In the above embodiment, the light source 4 is connected to the multi connector 2 or the single connector 30, and the optical power meter 24 to the light transmitting and receiving ferrule 7 to transmit the inspection light from the multi connector 2 or the single connector 30 to the light transmitting and receiving ferrule 7. However, the connecting relation may be reversed, and the light source 4 may be connected to the light transmitting and receiving ferrule 7, and the optical power meter 24 to the multi connector 2 or the single connector 30 so that the inspection light is transmitted from the light transmitting and receiving ferrule 7 to the multi connector 2 or the single connector 30.

Also, in the aforementioned embodiment, the intensity of the inspection light transmitted is determined by the optical power meter at a plurality of points to calculate the position of each optical fiber in accordance with the measurement points. However, the central position of each optical fiber may also be determined by, for example, photographing the exposed end of each optical fiber by a CCD camera and image-processing the picture.

What is claimed is:

1. A method for measuring the dimensions of an optical connector wherein a sample ferrule, which is provided with one or a plurality of fiber inserting holes in which at least one or a plurality of optical fibers are inserted and which is provided with a plurality of pin holes, is used to measure the positions of said fiber inserting holes, the method comprising the following steps:

removably inserting inspection ferrules with single optical fibers in the pin holes of said sample ferrule;

inserting an optical fiber or fibers in said fiber inserting hole or holes;

locating said sample ferrule in a specific position on a position measuring means which moves the sample ferrule in the direction of an X or Y axis and measures a new position of the sample ferrule on the X or Y axis;

butting a light transmitting and receiving ferrule provided with a light transmitting and receiving fiber, which is installed on a Z-axis stage which is positioned in the vicinity of said position measuring means and is free to move in the direction of a Z axis intersecting orthogonally with surfaces of the X and Y axes, against said sample ferrule in the direction of the Z axis through said Z-axis stage at a specific distance provided between them;

moving said sample ferrule in the direction of the X or Y axis by said position measuring means while letting in an inspection light emitted by a light source either through the optical fiber or fibers inserted in said fiber inserting hole or holes or through said light transmitting and receiving fiber and letting it out toward a light receiving means from the other side, thereby optically connecting said single optical fiber or one of said optical fibers to the light transmitting and receiving fiber;

moving said sample ferrule in the direction of the X or Y axis by said position measuring means and switching said light transmitting and receiving fiber to said single optical fiber or other optical fiber in succession to measure the inspection light irradiated to said light receiving means under specific measuring conditions, thereby measuring the position of each optical fiber of the sample ferrule and the inspection ferrules; and determining the position of the center of each fiber inserting hole based on the pin holes of said sample ferrule from the measurement results.

2. The method for measuring the dimensions of an optical connector according to claim 1, wherein said position measuring means is provided with an opening formed in accordance with the shape of said sample ferrule, and further including the step of locating and installing said sample ferrule to said position measuring means in a specific position on the X or Y axis.

3. The method for measuring the dimensions of an optical connector according to claim 1, wherein said position measuring means is provided with a plurality of V grooves in specific positions, and further including the step of locating and installing said sample ferrule in a specific position of said position measuring means on the X or Y axis.

4. The method for measuring the dimensions of an optical connector according to claim 1, wherein said position measuring means is provided with a Z-axis scale with a Z-axis controller, and further including the steps of measuring a specific butting distance between said light transmitting and receiving ferrule and said sample ferrule by said Z-axis scale, and measuring the position of each optical fiber of said sample ferrule and inspection ferrules while maintaining the specific butting distance at a constant value in accordance with pre-measured transmission losses of the inspection light based on the distance between said light transmitting and receiving ferrule and said sample ferrule.

5. The method for measuring the dimensions of an optical connector according to claim 4, wherein said Z-axis scale is a glass scale.

6. The method for measuring the dimensions of an optical connector according to claim 1, further including the steps of performing, as a specific measurement condition for measuring the position of each optical fiber of said sample ferrule and the inspection ferrules, measurement so that the intensity of an inspection light in a measurement performed with said single optical fiber or one of said optical fibers optically connected to the light transmitting and receiving fiber is equal to the intensity of each inspection light at the time when said sample ferrule is moved to a plurality of points in the direction of said X or Y axis by said position measuring means, determining the position of a pin hole from that measuring position, and then measuring the position of each optical fiber of said sample ferrule based on the position of the pin hole.

7. The method for measuring the dimensions of an optical connector according to claim 1, further including the steps of turning, as a specific measurement condition for measuring the position of each optical fiber of said sample ferrule and the inspection ferrules, each of said inspection ferrules in said pin hole for a plurality of times for a specific angle to determine the position of the pin hole from the position of said single optical fiber measured at each turn angle, and measuring the position of each optical fiber of said ferule based on the position of the pin hole.

8. The method for measuring the dimensions of an optical connector according to claim 1, further including the step of temporarily installing the optical fibers inserted in said fiber inserting holes in said fiber inserting holes.

9. The method for measuring the dimensions of an optical connector according to claim 1, further including the step of gluing and fixing the optical fibers inserted in said fiber inserting holes in said fiber inserting holes.

10. The method for measuring the dimensions of an optical connector according to claim 1, wherein said position measuring means consists of an X-Y stage provided with a laser scale.

11. The method for measuring the dimensions of an optical connector according to claim 1, further including the step of controlling movement of an X-Y stage into the direction of the X or Y axis by an X-Y controller.

12. The method for measuring the dimensions of an optical connector according to claim 1, further including the step of controlling movement of said Z-axis stage in the direction of a Z-axis by a Z-axis controller.

13. The method for measuring the dimensions of an optical connector according to claim 1, wherein the optical fibers inserted in said sample ferrule and the single optical fibers installed in said inspection ferrules, and the inspection ferrules are free of eccentricity in outside diameters thereof.

14. The method for measuring the dimensions of an optical connector according to claim 1, wherein the light source of said inspection light is an LED.

15. The method for measuring the dimensions of an optical connector according to claim 1, wherein the light source of said inspection light is a semiconductor laser.

16. The method for measuring the dimensions of an optical connector according to claim 1, wherein the light receiving means of said inspection light is an optical power meter.

17. The method for measuring the dimensions of an optical connector according to claim 1, further including the step of processing, based on the position of each optical fiber of said sample ferrule and inspection ferrules measured by said inspection light, the measurement results by an electronic control unit to determine the central position of each fiber inserting hole based on the pin holes of said sample ferrule.

* * * * *

UNITED STATES PATENT AND TRADEMARK OFFICE
CERTIFICATE OF CORRECTION

PATENT NO. : 5,220,407

DATED : June 15, 1993

INVENTOR(S) : M. YAMANE, ET AL.

It is certified that error appears in the above-identified patent and that said Letters Patent is hereby corrected as shown below:

Column 7, lines 15-20, change $$"(X_{11} - \overline{X}_{10})^2 + (\overline{Y}_{11} - Y_{10})^2 = R^2$$
$$(X_{12} - \overline{X}_{10})^2 + (\overline{Y}_{12} - Y_{10})^2 = R^2$$
$$\vdots \qquad \vdots$$
$$(X_{1n} - \overline{X}_{10})^2 + (\overline{Y}_{1n} - Y_{10})^2 = R^2"$$

to $--(X_{11} - \overline{X}_{10})^2 + (Y_{11} - \overline{Y}_{10})^2 = R^2$
$$(X_{12} - \overline{X}_{10})^2 + (Y_{12} - \overline{Y}_{10})^2 = R^2$$
$$\vdots \qquad \vdots$$
$$(X_{1n} - \overline{X}_{10})^2 + (Y_{1n} - \overline{Y}_{10})^2 = R^2--.$$

UNITED STATES PATENT AND TRADEMARK OFFICE
CERTIFICATE OF CORRECTION

PATENT NO. : 5,220,407

DATED : June 15, 1993

INVENTOR(S) : M. YAMANE, ET AL.

It is certified that error appears in the above-identified patent and that said Letters Patent is hereby corrected as shown below:

Column 9, line 50, change $$"L = \{(X_R - X_L)^2 + (Y_R - Y_L)^2\}^{178}"$$

to $--L = \{(X_R - X_L)^2 + (Y_R - Y_L)^2\}^{½}--$.

Signed and Sealed this

Twenty-second Day of March, 1994

Attest:

BRUCE LEHMAN

*Attesting Officer*   *Commissioner of Patents and Trademarks*